(No Model.)
C. A. HOXSIE.
NURSERY POND FOR FISH CULTURE.
No. 518,319. Patented Apr. 17, 1894.
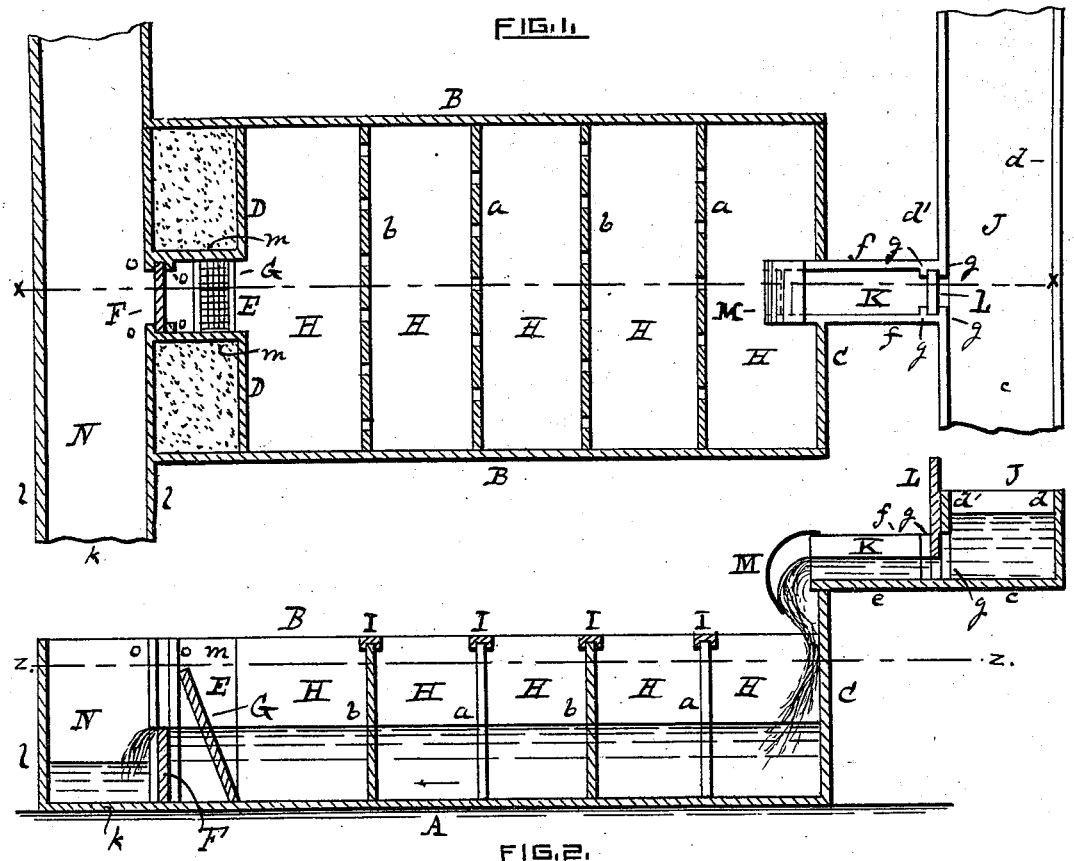
WITNESSES,
INVENTOR,

UNITED STATES PATENT OFFICE.

CHARLES A. HOXSIE, OF RICHMOND, RHODE ISLAND.

NURSERY-POND FOR FISH CULTURE.

SPECIFICATION forming part of Letters Patent No. 518,319, dated April 17, 1894.

Application filed February 9, 1891. Serial No. 380,821. (No model.)

*To all whom it may concern:*

Be it known that I, CHARLES A. HOXSIE, of the town of Richmond, in the county of Washington, in the State of Rhode Island, have invented a certain new and useful Improvement in Nursery-Ponds for the Culture of Small Fishes; and I declare the following to be a specification thereof, reference being had to the accompanying drawings.

Like letters indicate like parts.

Figure 1, is a top view of my improved pond, as seen partly in top plan and partly in horizontal section on line $z\ z$ of Fig. 2. Fig. 2, is a view of the same, partly in side elevation and partly in vertical section on line $x\ x$ of Fig. 1. Fig. 3, illustrates in top plan the water currents in a compartment of my improved pond.

The arrows indicate the direction of the water currents.

The purpose of my invention is to provide a pond suitable for the nurture of young fishes during the period when they are commonly designated as the "fry." My improved pond is an artificial inclosure of water and is made in a series of compartments divided from each other by slat partitions, having openings so arranged that those of one partition alternate with those of the next, and is also provided with proper inlets and outlets of water, flash-boards and means of aerating the water, as hereinafter particularly specified.

In the drawings the pond is shown as made of planks, or other suitable material, with a bottom A, sides B B and upper end or bulkhead C. At the lower end are the walls D D arranged to leave a central outlet E, whose sides are marked $m\ m$. A flashboard F is set vertically at the lower end of the outlet in guides $o\ o$. A screen G is set at an angle in said outlet. The pond is divided off into oblong compartments H H by partitions $a\ b$, which are composed of boards or slats arranged with small spaces between them to allow the passage of the water. These slats are fastened to the bottom A in any proper manner, and are secured in position by a tongued crosspiece I, shown in cross section in Fig. 2. The slats of the several partitions $a$ are so located that their openings are respectively in the same longitudinal lines, and the lines of the openings of the slats of the several partitions $b$ also coincide, but the openings of the partitions $a$ and $b$ do not coincide in their longitudinal lines, but alternate, as clearly shown in Figs. 1 and 3.

J is a water-way or passage conveying water from a brook or reservoir, and is considerably higher than the artificial pond. It has the bottom $c$ and the sides $d\ d'$. From the latter opens an inlet K, having the bottom $e$ and the sides $f$. A gate L is placed at the upper end of the inlet and is vertically movable in guide-ways $g$. A hood M is put on the top of the sides $f$ at the lower end of the inlet K and is curved, as shown in Fig. 2, leaving an open space between its under edge and the lower end of the inlet. The end board or bulkhead C extends from the bottom $e$ of the inlet K to the bottom A of the pond. At the lower end of the pond the water passes from the outlet E into the sluice-way N, which has the bottom $k$ and the sides $l\ l$. By raising the gate L the quantity of water may be regulated, which flows through the pond. The flashboard or dam F determines the depth of the water in the pond, and by using flashboards of different heights, the pond may be made as deep or shallow as may be desired. The utility of this device to vary the depth of the water, is that the water should be made more shallow for the younger fry, and be deepened as they grow older. The water flows from the waterway J, under the gate L, through the inlet passage K and strikes against the hood M. Here the current is deflected downward and backward and dashed against the bulkhead C, which again deflects it; whence it is thrown forward and downward into the waters of the pond. This flow of the water is fully illustrated in Fig. 2. The purpose of this repeated and violent deflection of the falling water, is to break up its mass as much as possible, in order to thoroughly aerate it. It is thus converted into a foaming stream on account of the great quantity of air, which is incorporated with it, the presence of which is evidenced by innumerable air-bubbles. As the water falls from a higher plane than that of the pond, its gravity causes this foaming mass to penetrate the water of the pond to a considerable depth, comparatively, thus submerging the air-bubbles.

The partitions $a\ b$, which divide the pond into compartments, are made with vertical slats, so placed as to leave openings or water ways between them, the openings of each partition being located in a direction diagonal to those of the next partition. The purpose of this alternate arrangement of these openings is to diversify the water currents of the pond and to break the force of the currents. In Fig. 3, I illustrate in top plan the effect of these slats and openings in changing the currents. The water, seen passing through the openings of the partition a, has a comparatively strong current there, because narrow and concentrated; but as soon as it has passed through these openings, it widens and spreads, and the current is correspondingly weaker. The currents then being intercepted by the slats of the partition b, (whose openings alternate in position with those of the partition a) are divided and deflected there. The currents so far described are direct currents. But back of each slat of the partition a are reflex currents and eddies of varying strength, and the water, though in motion, has comparatively less force in these places, because it is not subject to a direct current there and the reflex currents tend to neutralize each other. For a like reason, but to a less degree, the water directly in front of the slats of the partition b is weaker in current, because there deflected and formed into eddies, while seeking escape through the openings on either side.

The result of the aeration of the water by the hood and fall in combination with the deflection and diversification of the currents in the compartments of the pond, is that the air-bubbles are submerged and distributed throughout the whole body of the water in the pond, giving the pond everywhere a peculiarly brilliant, sparkling and lively appearance, which indicates a thorough aeration of the whole pond, and thereby adapts it to the wants of the fishes; for it is well known that fishes, though living in water, breathe air, which air is held in suspension between the atoms of the water, being introduced into the water, under natural conditions, by the various inequalities in the bed and banks of a stream or by rocks and obstructions therein; while under artificial conditions, as in the construction of fish ponds hitherto, there have been no means provided for the aeration of the water, so that there is a great mortality of fishes under these unnatural circumstances, simply because they are not able to get air enough to breathe.

In nursery ponds for fish culture it is very important that all the natural conditions of fish-life shall be provided. The fry fish are delicate and weak. They easily perish in an unfavorable environment. The water must be shallow and the currents must be gentle and varied. In the usual artificial ponds, where the water has a direct current between parallel walls, like a sluiceway, the fishes habitually head up-stream and if not strong enough to stem the current, are carried against the screen and die. But in my improved pond, they may swim in the direct currents, if they choose to do so, or in the quieter waters of the eddies and reflex currents, or may find refuge behind the slats of the partitions, where they are entirely protected from the force of the stream. The openings between the slats allow the fishes to pass freely from one compartment to another. By this contrivance I am also able to distribute the food, which, having been properly prepared and made of the requisite fineness, is thrown into the water, preferably above the fall, and is carried by the various currents and eddies to every part of each compartment.

As the water is so thoroughly aerated, a larger number of fishes can be grown in a given space and quantity of water, than is possible where the water is imperfectly aerated; moreover, if desirable, I can by this construction, use a much larger quantity of water than has usually been used in nursery ponds, because the force of the current is broken, so as not to be injurious to the life or health of the fishes, as it would be in a common straight pond.

In practice, I place a series of nursery ponds, side by side, each having the inlet K, conducting water from the water way J, and each having an outlet E, discharging into the waste-way N.

I claim as a novel and useful invention and desire to secure by Letters Patent—

1. The combination with an artificial fish-pond having a bulkhead C, of an inlet passage K, elevated above the pond and adapted to receive water from a proper source and to discharge into the pond, and a hood M, attached at the discharging end of said passage and arranged so as to break the force of the water-flow and to deflect the falling water back against the bulkhead, substantially as and for the purposes specified.

2. In an artificial fish-pond, the combination of a passage for a water supply, an inlet leading therefrom to the pond, a gate vertically movable in guides in said inlet to regulate the quantity of water and the force of the current passing through said pond, and a waste-way, substantially as set forth.

3. The improved artificial fish-pond herein described, consisting of the pond having the bottom A, sides B, bulkhead C and walls D, divided into compartments H by slat partitions a b, which have openings alternately arranged, the inlet passage K having the hood M, the outlet passage E having the screen G, the gate L and flashboard F, the water way J and the waste-way N, all combined substantially as specified.

CHARLES A. HOXSIE.

Witnesses:
WARREN R. PERCE,
DANIEL W. FINK.